(12) United States Patent
Moore

(10) Patent No.: US 6,691,754 B1
(45) Date of Patent: Feb. 17, 2004

(54) ELECTROMAGNETICALLY ACTIVATED ON-WHEEL AIR PUMP

(75) Inventor: Thomas S. Moore, Oxford, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 12 days.

(21) Appl. No.: 10/205,547

(22) Filed: Jul. 24, 2002

(51) Int. Cl.⁷ .......................... B60C 23/10; B60C 29/00
(52) U.S. Cl. ..................... 152/419; 152/418; 152/415
(58) Field of Search ................. 73/146.2, 146.3; 340/426.33, 442; 152/415, 418, 419

(56) References Cited

U.S. PATENT DOCUMENTS

| | | | | |
|---|---|---|---|---|
| 4,742,857 A | * | 5/1988 | Gandhi ....................... | 152/418 |
| 4,840,212 A | * | 6/1989 | Wei .............................. | 152/419 |
| 5,325,902 A | * | 7/1994 | Loewe et al. ............... | 152/419 |
| 5,413,159 A | * | 5/1995 | Olney et al. ................ | 152/418 |
| 5,469,136 A | * | 11/1995 | Matsubara et al. .......... | 340/445 |
| 5,505,080 A | * | 4/1996 | McGhee ..................... | 73/146.5 |
| 5,558,730 A | | 9/1996 | Olney et al. ................ | 152/418 |
| 5,898,103 A | | 4/1999 | Denz et al. .................. | 73/49.2 |
| 6,612,165 B2 | * | 9/2003 | Juzswik et al. ............ | 73/146.5 |

FOREIGN PATENT DOCUMENTS

EP  0 284 895 B1  12/1992

OTHER PUBLICATIONS

"Hybrid Propulsion Truck Platform Dually Developed by the U.S. Army and DaimlerChrysler", SAE Paper Number 2001–01–2794, pp. 31–38.

* cited by examiner

Primary Examiner—S. Joseph Morano
Assistant Examiner—Jason R. Bellinger
(74) Attorney, Agent, or Firm—Ralph E. Smith

(57) ABSTRACT

The present invention couples a tire pump with the wheel rim of a vehicle. The pump is activated electromagnetically to inflate the tire as desired, e.g. when tire pressure is below a required value. The pump is arranged to draw air from the atmosphere and pump into an interior portion of the tire. A magnetized plunger within the pump is biased to an initial position by a biasing element. Energizing an electromagnet generates a magnetic field. The pump is arranged to rotate in and out of the magnetic field to cause the plunger to reciprocate and inflate the tire.

24 Claims, 2 Drawing Sheets

ELECTROMAGNETICALLY ACTIVATED ON-WHEEL AIR PUMP

FIELD OF THE INVENTION

The present invention relates to air-inflated tires of automotive vehicles. More specifically, the invention relates to an electromagnetically activated pump for inflating the tires on such vehicles.

BACKGROUND OF THE INVENTION

Tire pressure is one of the most important elements of drivability and safety on automotive vehicles. Insufficient tire pressure may cause excessive or uneven tread wear, decreased fuel efficiency, and poor traction. Although there are several common causes of improper tire pressure, most tires will lose air pressure on a day-to-day basis with normal use. Tires may lose up to and beyond one pound per square inch (psi) of air pressure per month.

It is proper practice, therefore, for an automotive vehicle operator to check and maintain tire pressure periodically to ensure adequate performance. Although it is recommended that a vehicle operator check tire pressure on a regular basis, adequate maintenance does not always occur. Furthermore, even when tire pressure is properly monitored, problems may surface. It is possible for a tire to acquire a slow leak, which an inexperienced or inattentive operator may not notice. Additionally, changes in ambient air temperature throughout the day can result in a significant change in tire pressure.

It is therefore desirable to provide a means for self-inflating a tire to counteract normal tire pressure loss. Some current self-inflating tire pumps rely on the centrifugal force created by tire rotation to initiate the action of the pump. However, such an approach to self-inflation is not available at all vehicle speeds, as such pumps are designed to be activated only when the centrifugal force exceeds a specific value. Furthermore, current self-inflation systems do not actually pump the needed air into the tire until the vehicle speed is reduced. The centrifugal force must return below the value needed for pump activation in order to initiate inflation.

Additionally, some pumps utilize tire pressure monitoring (TPM) systems. TPM systems communicate tire pressure status to the vehicle operator through intra-vehicular means such as a dashboard light or indicator. Vehicles equipped with a TPM system are often further equipped with a device such as an on-board compressor to correct air pressure deficiencies. When the TPM system detects a low tire pressure signal, it relays the information to the on-board compressor system, which then operates to inflate the corresponding tire. Such compressor systems are large and bulky and can be expensive to implement.

SUMMARY OF THE INVENTION

The present invention inrtegrates a tire pump with the wheel rim of a vehicle. The pump is activated electromagnetically to automatically inflate the tire when tire pressure is below a required value.

The pump extends from the atmosphere through the wheel rim and into the interior portion of the tire. The portion of the pump which is exposed to the atmosphere contains an air inlet for allowing air into the pump. A plunger within the pump operates to provide both opened and closed positions. In the open position, air from the atmosphere is allowed into the pump through the air inlet. When the plunger moves to the closed position, air is pushed through a valve into the inflatable portion of the tire.

The plunger is forced into the open position by a biasing element. The biasing element retains the plunger in the open position until an electromagnet is activated. The electromagnet, which is located on a vehicular component in close proximity with the wheel rim, reacts against the plunger, which is a permanent magnet, forcing the plunger into the closed position. The electromagnet, which is activated upon receiving a low tire signal from the vehicle's body controller, reacts with the plunger when normal wheel rotation moves the pump within close proximity to the electromagnet. The biasing element returns the plunger to the open position when wheel rotation moves the pump out of the range of the electromagnet.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
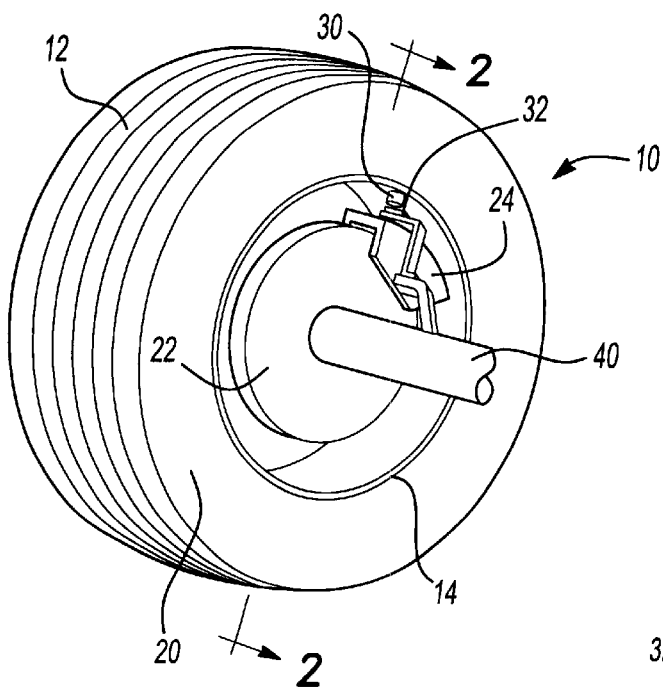
FIG. 1 a side view of a vehicle wheel employing the integrated air pump and mounted electromagnet of the present invention.
Figure 2:
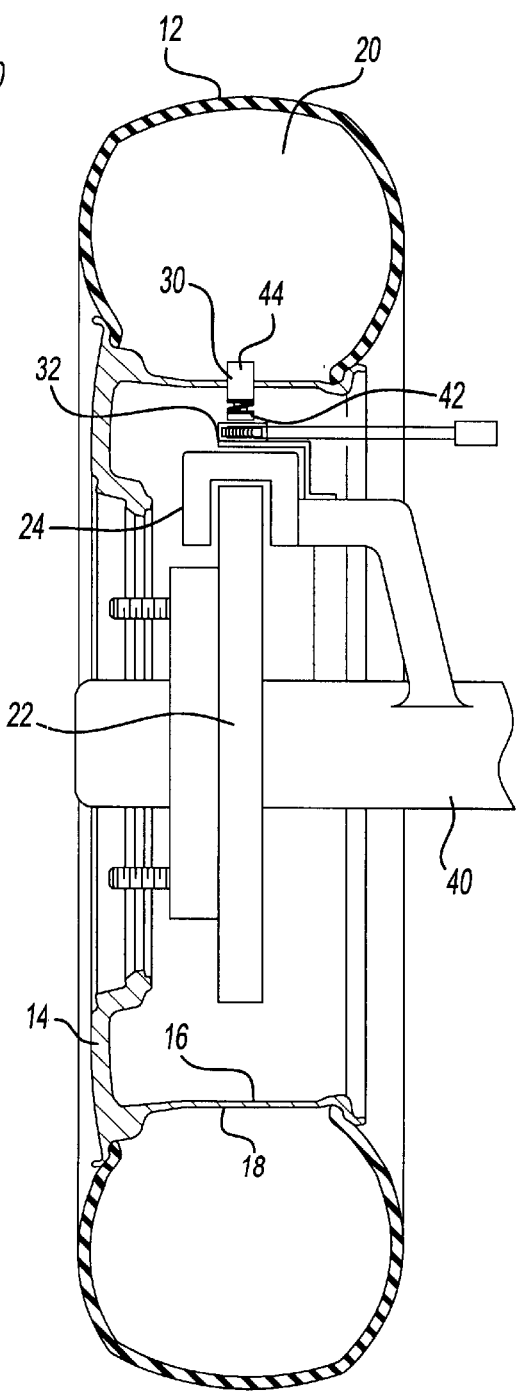
FIG. 2 is a cross-section of the vehicle wheel of FIG. 1 employing the air pump and electromagnet of the present invention.

Referring to FIG. 1 and FIG. 2, a vehicle wheel 10 as is used for automotive vehicles includes an inflatable tire 12 which is mounted on a wheel rim 14 having an inner annular surface 16 and an outer annular surface 18. An inflatable region 20 is disposed between the outer annular surface 18 of the wheel rim 14 and the inner surface of the inflatable tire 12. The wheel 10 is mounted on an automotive vehicle, bringing the wheel rim 14 in proximity with vehicle components such as the brake rotor 22 and brake caliper support 24.

An electromagnetically activated air pump 30 embodying the present invention is integrated with the wheel rim 14. The pump 30 extends from the inner annular surface 16 to the outer annular surface 18. As described more fully below, the pump 30 interacts with an electromagnet 32 mounted on the brake caliper support 24 to force air from the atmosphere through the wheel rim 14 and into the inflatable tire 12.

Referring to FIG. 2, a cross-section of the vehicle wheel 10 mounted on a vehicle axle 40 is shown. The radially inner portion 42 of the pump 30 is exposed to atmosphere. The pump 30 passes through the wheel rim 14 and terminates with the radially outer portion 44 in fluid communication with the interior of inflatable tire 12. An electromagnet 32 is mounted on a vehicular component within the perimeter defined by the inner annular surface 16 of the wheel rim 14. Although the electromagnet 32 as shown is mounted on the brake caliper support 24, those skilled in the art will anticipate that the electromagnet 32 may be mounted on other proximate vehicular components. Likewise, the pump 30 may be mounted elsewhere on the annular portion of the wheel rim 14. In one possible alternative arrangement, the pump 30 is mounted parallel to the axis of the wheel 10. In this arrangement, the centrifugal force created by tire rotation has a minimized effect on the performance of the pump 30.

Figure 3:
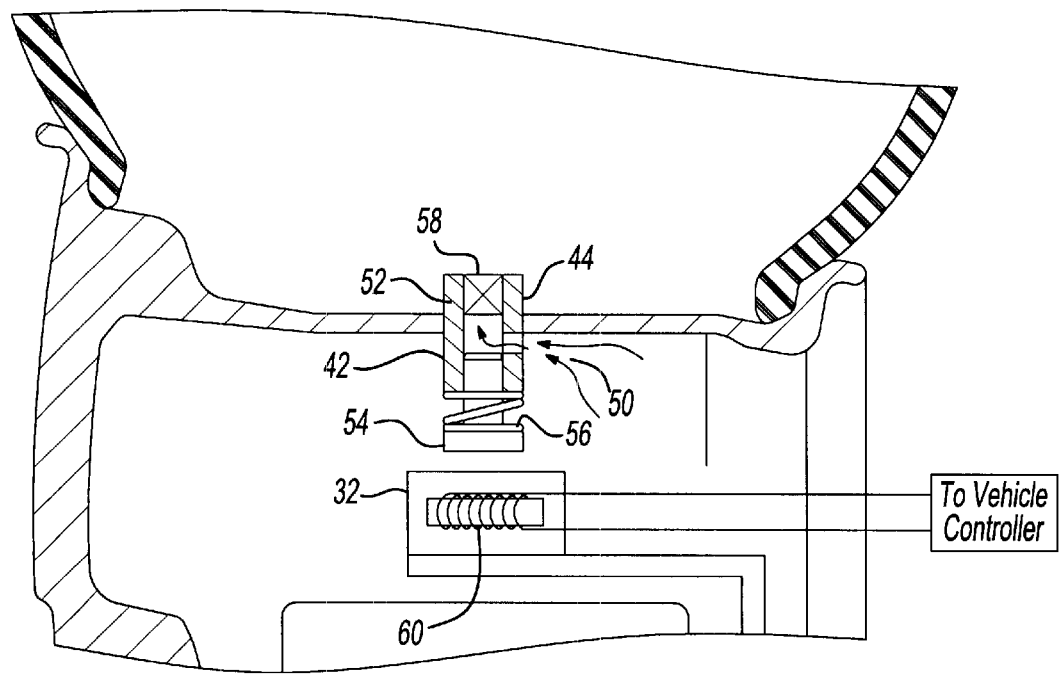
FIG. 3 is a diagram showing the pump of the present invention with the piston in the open position.

As shown in FIG. 3, the pump 30 includes an air inlet 50. The air inlet 50 is disposed on the radially inner portion 42 of the pump body 52. A plunger 54 having a magnet integrated therewith is disposed within the pump body 52. The plunger 54 may be magnetic, or include a magnetic component fixedly attached thereto. The plunger 54 is shown in the open position, which allows air from the atmosphere to enter the pump body 52 through the air inlet 50. A biasing element 56 retains the plunger 54 in the open position. As shown, the biasing element 56 is illustrated as a spring. In one possible alternative embodiment, the biasing element 56 May be a permanent magnet disposed within the pump body 52 which retains the magnetic plunger 54 in the open position. The air inlet 50 can be a one-way valve which allows air from the atmosphere through the air inlet 50 into the pump body 52, but prevents air from within the pump body 52 from entering the atmosphere.

Figure 4:
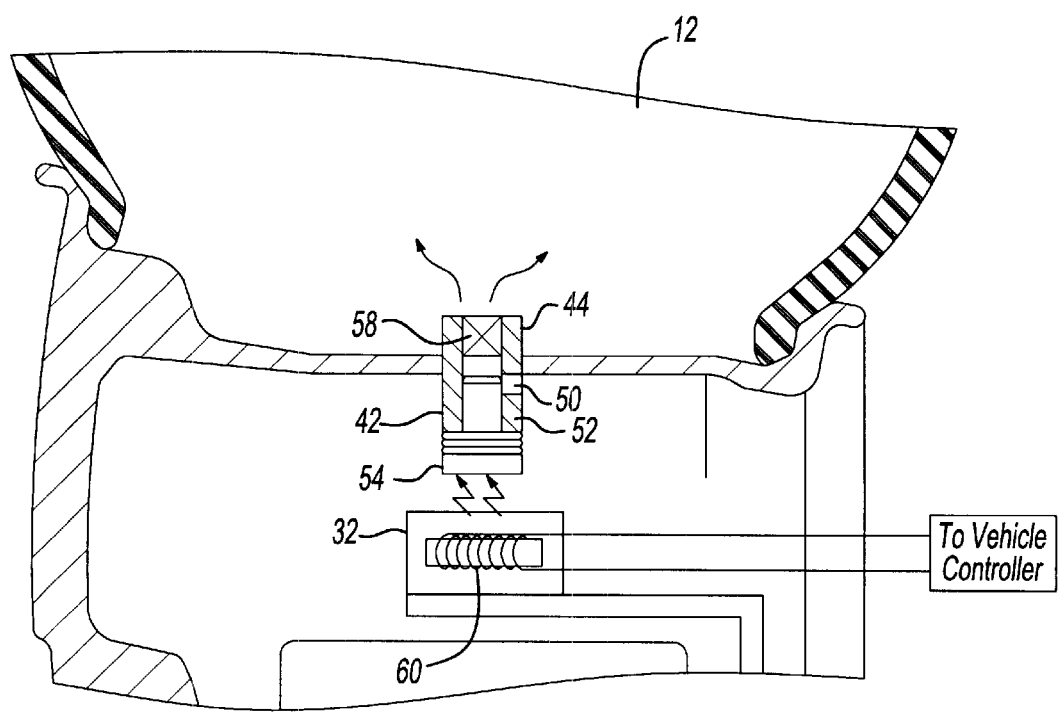
FIG. 4 is a diagram showing the pump in close proximity with the electromagnet causing the piston to be in the closed position.

Referring to FIG. 3 and FIG. 4, the radially outer portion 44 communicates with the inflatable tire 12. Air within the pump body 52 is forced through the radially outer portion 44 as the magnetic plunger 54 moves into the closed position, as shown in FIG. 4. In the exemplary embodiment shown, the radially outer portion 44 includes a one-way valve 58 which allows air to enter the inflatable tire 12 but prevents air from entering the pump body 52 from the inflatable tire 12. The shape of the plunger 54 is substantially equivalent to that of the pump body 52 so as to allow the plunger 54 to reciprocate within the pump body 52. In one embodiment, the plunger 54 and the pump body 52 are cylindrical.

The electromagnet 32 is fixedly located so that normal rotation of the wheel rim 14 will move the pumps 30, and therefore the magnetic plunger 54, within proximity of the electromagnet 32. When the magnetic plunger 54 is within a predetermined range of the electromagnet 32, if the electromagnet 32 is energized a force is exerted on the plunger 54 of sufficient strength to overcome the biasing element 56, causing the plunger 54 to move to the closed position as shown in FIG. 4. When normal rotation, of the wheel rim 14 moves the plunger 54 out of proximity with the electromagnet 32, the resulting absence of magnetic force upon the plunger 54 from the electromagnet 32 allows the biasing element 56 to return the plunger 54 to the open position as shown in FIG. 3.

The electromagnet 32 includes an electric coil 60. When the electric coil 60 is selectively energized, it provides the magnetic field of the electromagnet 32. When the electric coil 60 is not energized, no magnetic field is produced, regardless of whether the plunger 54 and electromagnet 32 are in proximity. In an alternative embodiment, the electromagnet 32 is a permanent magnet which is enhanced by the electric coil 60. When the electric coil 60 is energized, the strength of the resulting magnetic field is added to the strength of the permanent magnet. With this arrangement, the relative size of the electromagnet 32 and the electric coil 60 may be reduced while maintaining sufficient strength to overcome the biasing element 56. Correspondingly, the power delivered to the electric coil 60 may be reduced.

When pressure in the inflatable tire 12 is low due to insufficient air such as detected by a tire pressure monitoring arrangement, the electric coil 60 receives an activation command form a vehicle controller (not shown). When the coil is activated, the electromagnet 32 and biasing element 56 exert off-step opposing forces upon the plunger 54 due to normal rotation of the wheel rim 14. The subsequent reciprocating motion of the plunger 54 causes air to be drawn into the pump body 52 through the air inlet 50 and then pumped into the inflatable tire 12. When pressure within the inflatable tire 12 returns to a sufficient level, the electric coil 60 is deactivated, and the plunger 54 returns to the open position.

It is to be understood that the configuration of the pump 30 may be implemented in ways other than those illustrated. In one embodiment, the electromagnet 32 forces the plunger 54 into the open position, and the biasing element 56 returns the plunger 54 to the closed position. Alternatively, the radially outer portion 44 of the pump 30 further comprises a valve which allows air to enter the pump body 52 from the inflatable tire 12 when pressure within the inflatable tire 12 is excessive. Such a situation may arise due to ambient temperature changes.

It is also to be understood that the activation of the electric coil 60 may be achieved using different methods. In one embodiment, the electric coil 60 is activated by a controller. Alternatively, the electric coil 60 can be selectively activated by a vehicle operator from within the vehicle. Additionally, the tire pressure at which the electric coil 60 is activated may be varied according to operator preference, tire specifications, and environmental conditions. In the case of a leak in the inflatable tire 12, the electric coil 60 will experience near-continuous activation. In this circumstance, a feedback or other suitable detection arrangement capable of detecting such constant, or near constant, activation of the pump could be provided to notify the operator that such a leak is present.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An arrangement for filling a tire mounted on a wheel rim with air comprising:

an electromagnetically activated pump having a pump body adapted to extend from an inner annular surface of a wheel rim to an outer annular surface of the wheel rim and having an outlet port adapted to be in fluid communication with an interior of the tire;

an air inlet disposed on the pump body and in communication with atmosphere;

a plunger comprising a magnetic element, the plunger disposed within said pump body and having an open position in which said plunger draws air from said atmosphere into said pump body through said air inlet, and a closed position in which said plunger forces air within said pump body through the outlet port;

a biasing element for biasing said plunger toward one of said open or closed positions; and an electromagnet adapted to be fixedly located on the vehicle within a defined perimeter proximate the pump, the electromagnet being selectively energized to be in magnetic communication with said plunger, said magnetic communication overcoming the biasing of said plunger.

2. The arrangement of claim 1 wherein the outlet port comprises a valve arranged to prevent airflow into said pump body and allow airflow into said inflatable tire.

3. The arrangement of claim 1 wherein said air inlet is arranged to prevent flow of air from the pump into the atmosphere and allow flow of air into said pump body.

4. The arrangement of claim 1 wherein said biasing element is a spring.

5. The arrangement of claim 1 wherein said biasing element is a permanent magnet in magnetic communication with said plunger.

6. The arrangement of claim 1 wherein said biasing element is disposed on said pump body.

7. The arrangement of claim 1 wherein said biasing element is disposed on said wheel rim.

8. The arrangement of claim 1 wherein said electromagnet comprises an electrically energized coil.

9. The arrangement of claim 8 wherein said coil can be de-energized.

10. The arrangement of claim 1 wherein said electromagnet comprises a permanent magnet and an electrically energized coil.

11. The arrangement of claim 1 wherein the electromagnet is mounted to a brake caliper support.

12. The arrangement of claim 1 wherein said plunger is moved into magnetic communication with said electromagnet by rotation of said wheel rim, said magnetic communication forcing said plunger into said closed position.

13. The arrangement of claim 12 wherein said plunger is moved out of magnetic communication with said electromagnet by rotation of said wheel rim, said biasing element forcing said plunger into said open position.

14. A method for selectively activating a pump to inflate a tire mounted on a wheel rim, wherein the pump is connected to the wheel rim, the method comprising the steps of:
providing a pump body extending from an inner annular surface to an outer annular surface on the rim and having an inlet communicating with atmosphere and an outlet port in fluid communication with an interior of the tire;
providing a magnetized plunger within said pump body, the plunger arranged to reciprocate between an open position in which said plunger allows air from said atmosphere to enter said pump body through said inlet, and a closed position in which said plunger forces air within said pump body through said outlet port;
biasing said plunger toward an initial position selected from one of said open and-closed positions;
locating an electromagnet on a fixed structure within a defined perimeter proximate the pump;
selectively energizing said electromagnet;
moving the pump to position said plunger within a magnetic field generated by the energized electromagnet to produce a force on the magnetized plunger sufficient to overcome the bias;
moving the pump to position said plunger out of the magnetic field; and
biasing said plunger toward said initial position.

15. The method of claim 14 wherein said air inlet is arranged to only allow airflow into said pump body.

16. The method of claim 14 wherein said biasing element is a spring.

17. The method of claim 14 wherein said biasing element is disposed on said pump body.

18. The method of claim 14 wherein said biasing element is disposed on said wheel rim.

19. The method of claim 14 further comprising the step of selectively energizing said electromagnet in response to a control signal.

20. The method of claim 14 further comprising the step of de-energizing said electromagnet in response to a control signal.

21. The method of claim 17 wherein said electromagnet is disposed on a vehicular component within close proximity to said wheel rim.

22. A method for inflating a tire on a vehicle comprising:
positioning a pump to be in fluid communication with the tire and rotatable therewith relative to the vehicle, said pump including a magnetized plunger arranged to reciprocate therein to draw air from the atmosphere and force into the tire;
positioning an electromagnet on a fixed structure of the vehicle and within a defined range proximate the pump; and
selectively energizing the electromagnet to generate a magnetic field and cause the magnetized plunger to reciprocate as the pump rotates in and out of the magnetic field.

23. The method of claim 22 further comprising the step of selectively energizing said electromagnet in response to a control signal.

24. The method of claim 23 further comprising the step of de-energizing said electromagnet in response to a control signal.

* * * * *